March 29, 1932. A. W. CLARKE 1,851,752
ARTICULATED CAR
Filed Dec. 22, 1930
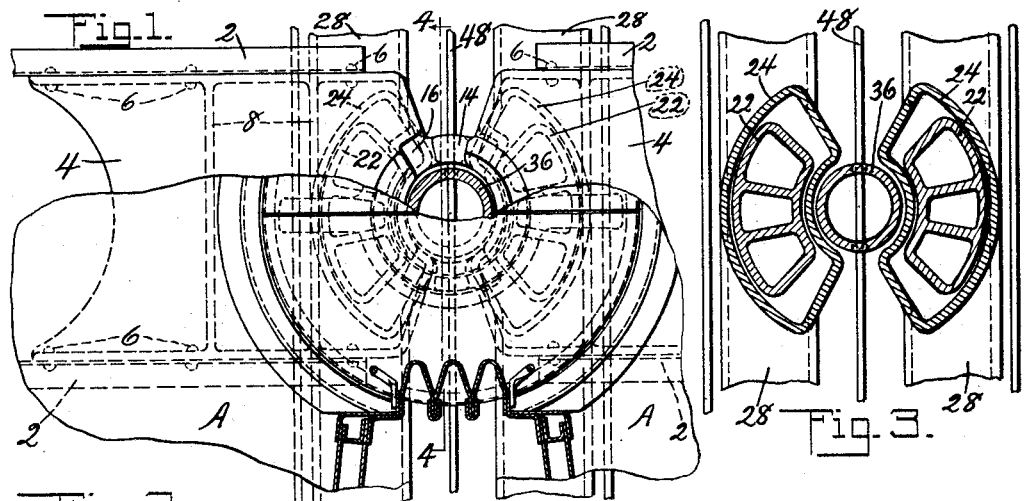
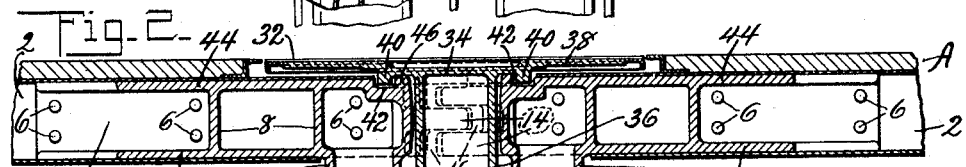
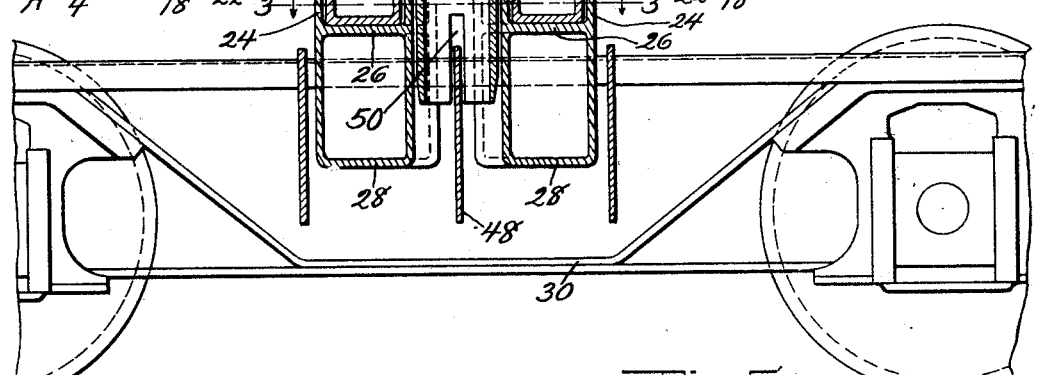
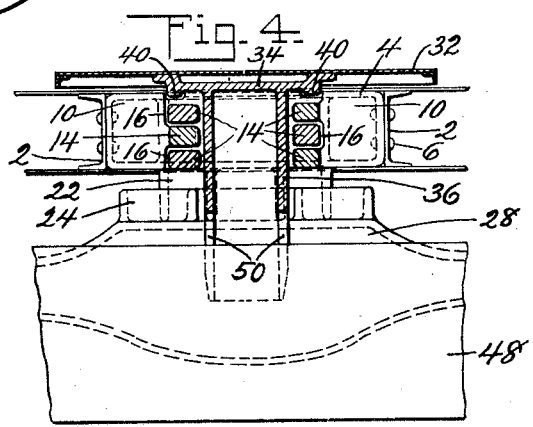
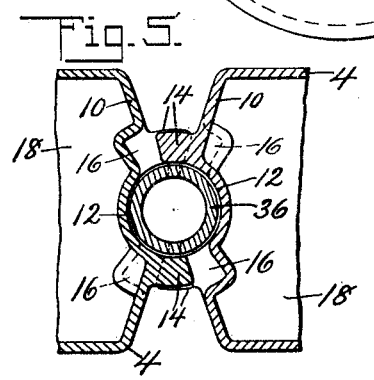
INVENTOR
Allen W. Clarke
BY
ATTORNEY Patented Mar. 29, 1932

1,851,752

UNITED STATES PATENT OFFICE

ALLEN W. CLARKE, OF RIDGEWOOD, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed December 22, 1930. Serial No. 504,013.

This invention relates to articulated cars of the type in which the adjacent end portions of two car bodies are supported by a single truck known in the art as a pivot truck, and the invention contemplates certain improvements and modifications of the invention shown in application Serial No. 492,687, filed November 1, 1930, by Allen W. Clarke and William Griffin.

One object of this invention is the provision of a connection for the adjacent end portions of adjacent car bodies which will maintain said end portions in their proper positions relative to each other and at the same time permit the required relative swiveling of the bodies.

Another object of this invention is the provision of a connection for the adjacent end portions of adjacent car bodies of an articulated car which includes a pivot truck having a pair of independently functioning bolsters each of which is adapted to support one of two adjacent end portions of car bodies.

Still another object of the present invention is the provision of means for supporting a foot plate which bridges the space between the adjacent end portions of adjacent car bodies.

A further object of this invention is the provision of an articulated car comprising a pair of car bodies arranged end to end in spaced relation, the adjacent end portions of the car bodies being each supported by independently functioning truck bolsters and a spacing and buffing element arranged between the adjacent end portions of said bodies and supported thereby for retaining the bodies in their proper relative positions, said element being adapted to support a foot plate.

A still further object of this invention is the provision of an articulated car comprising a plurality of car bodies arranged end to end in spaced relation with their adjacent end portions supported by a single truck, and means for preventing excessive relative sidewise and vertical shifting of said bodies.

Other objects and advantages of this invention will be apparent from the following description taken in conjunction with the accompanying drawings in which:

Fig. 1 is a top plan view showing parts of the adjacent end portions of two car bodies, certain parts being shown in section and other parts being broken away.

Fig. 2 is a central vertical sectional view of the construction shown in Fig. 1.

Fig. 3 is a sectional view on the line 3—3, Fig. 2.

Fig. 4 is a sectional view on the line 4—4, Fig. 1, and

Fig. 5 is a detailed sectional view showing the interfitting of the body connection castings.

The present invention is designed to couple the adjacent end portions of two car bodies and to provide a supporting means for said adjacent end portions. In the drawings, only portions of two car bodies are shown as the present invention is not concerned with the specific construction of the bodies; only such parts as are necessary to an understanding of this invention being illustrated. The portions of the car bodies are indicated generally at A and said bodies are provided with suitable underframes including spaced members 2, channel shaped in the instance shown, defining center sills between which at the adjacent end portions of the bodies are arranged body connection castings 4 which are of such dimensions as to fit between the members 2 and are preferably secured to the latter by means of fasteners such as the rivets 6.

The castings 4 are preferably hollow structures reinforced by internal ribs 8 and are provided with walls 10 at their forward ends which latter are formed with longitudinally extending recesses 12 arranged substantially midway between the side walls as clearly shown in Fig. 5.

The castings 4 are so formed as to be interfitting, for a purpose hereinafter described, and to that end, each casting is provided with a tongue 14 projecting from the end wall 10 adjacent the recess 12 and arranged at one side of said recess, and with a groove 16 formed in said end wall adjacent the other side of said recess, the tongues 14 and recesses 16, as shown more clearly in Fig. 2 being vertically arranged. The castings 4 for the respective car bodies are identical and it will be obvious that when the castings are arranged as shown in Fig. 1 and the car bodies arranged end to end, the tongue 14 of one casting will be received in the groove or recess 16 of the opposite casting such as shown clearly in Figs. 2, 4 and 5.

Slightly inset from the forward ends of the castings 4 and depending from the lower walls 18 of said castings are segmental shaped body bearings 22 which are received in truck bearing plates 24 carried by the upper surfaces 26 of truck bolsters 28 carried by a truck 30. The truck is shown more or less diagrammatically and the bolsters 28 are independently functioning and each is adapted to support the end portion of one of two adjacent car bodies whereby to permit certain independent movements of said bodies.

To bridge the space between the adjacent end portions of the car bodies to provide means for permitting passage from one body to the other, a foot plate 32 is provided. The foot plate is substantially circular in shape and is secured to the head 34 of a combined spacing and buffing element 36, which latter, in the instance shown is a hollow pin though obviously may assume other forms, if desired. In practice, the head 34 includes an offset marginal edge 38 for supporting the foot plate and to which the later is secured. The head also includes a depending annular rib 40 adapted to seat in arcuate recesses 42 formed in the upper surfaces 44 of castings 4 adjacent their front ends; the recesses defining shoulders 46 at the front ends of the castings on which the head 34 of the spacer element rests to support the latter. The pin 36, just described, is arranged between the adjacent end portions of the car bodies, and more particularly is arranged between the body connection castings 4. The pin is cylindrical and is fitted in the oppositely arranged recesses 12 formed in the front walls 10 of the castings 4.

The lower end of the pin straddles a transverse truck member, which, in the instance shown, is a transom 48; the lower end of the pin being provided with oppositely arranged longitudinal slots 50. It will be apparent that rotation of the foot plate is prevented due to the engagement of the pin 36 with the transverse truck member, though obviously, the bodies may swivel horizontally relative to the foot plate.

It is believed that the construction of the present invention will be clear from the above description without further elaboration. In use the car bodies swivel relative to each other in the connected body and truck bearings 22 and 24 about the pin 36 as a center. It will be clear that relative vertical shifting of the end portions of the car bodies is permitted to an extent required due to breaks in track grades, but excessive relative vertical shifting is prevented by reason of the interengagement of the body connection castings 4 at the tongue and groove portions of the adjacent ends of said castings. The car bodies are permitted to shift relatively in a sidewise direction to a certain extent in accordance with curvature in tracks but excessive relative sidewise shifting is prevented by the combined spacing and buffing element 36 arranged in the recesses 12. Buffing shocks are taken by the pin 36 as will be apparent, said shocks being transmitted from the bodies to the truck through said pin. Pulling stresses are transmitted from the bodies to the truck through the connected body and truck bearings and also through the connections of the castings 4 with the head 34 of the pin 36. Pulling stresses are also transmitted from one body to the other through the connections of the head 34 of the pin 36 with the adjacent ends of the castings 4.

It will be apparent that the foot plate, due to the connection of the pin 36 with the transverse truck member 48, is maintained in a position fixed with respect to the truck and that the end portions of said bodies swivel relative to the foot plate.

The present construction provides a strong and durable articulated joint and a joint which is formed of few parts and which is easy and inexpensive to manufacture and which may be readily assembled and disassembled. The drawings show one embodiment of the invention but it is to be understood that they are for illustrative purposes only and various changes in the form and proportions of the construction shown may be made within the scope of the appended claims without departing from the spirit of the invention.

What is claimed is:

1. In an articulated car, a pair of car bodies, a truck beneath the adjacent end portions thereof, provided with a pair of bolsters, a segmental bearing plate on each bolster, body castings secured to the adjacent end portions of said bodies and provided with segmental body bearings engaged respectively with said bearing plates, a transverse truck member, a combined spacing and buffing element interposed between and supported by the said castings and having its lower end engaged with the transverse truck member to retain said spacing and buffing element fixed with respect to the truck whereby swiveling of the bodies is relative thereto, and a foot plate secured to the said spacing and buffing element.

2. In an articulated car, a pair of car bodies having their adjacent end portions interengaged to permit relative horizontal swiveling and to prevent excessive relative vertical shifting, truck bolsters on which the said adjacent end portions are respectively supported, a buffing element arranged between and supported by the adjacent end portions of the car bodies, and a foot plate secured to the buffing element and overlapping the adjacent end portions.

3. In an articulated car, a pair of car bodies having their adjacent end portions interengaged to permit relative horizontal swiveling and to prevent excessive relative vertical shifting, a truck for supporting the adjacent end portions, a combined spacing and buffing element arranged between and supported by the adjacent end portions adapted to prevent excessive relative sidewise shifting of the bodies, and a transverse truck member with which said spacing and buffing element is engaged.

4. In an articulated car, a pair of car bodies, a truck for supporting the adjacent end portions thereof, said truck having a pair of bolsters for respectively supporting said adjacent end portions, the adjacent end portions being longitudinally recessed, a transverse truck member intermediate the bolsters, a buffing element arranged in said recesses and supported by the adjacent end portions, the buffing element defining the center for swiveling movement of the bodies and being engaged with the transverse truck member whereby swiveling of the bodies is relative to said buffing element.

5. In an articulated car, a pair of car bodies, a truck for supporting the adjacent end portions thereof, said truck having a pair of bolsters for respectively supporting said adjacent end portions, the adjacent end portions being longitudinally recessed, a transverse truck member intermediate the bolsters, a buffing element arranged in said recesses and supported by the adjacent end portions, the buffing element defining the center for swiveling movement of the bodies and being engaged with the transverse truck member whereby swiveling of the bodies is relative to said buffing element, and a foot plate supported by the said buffing element.

6. In an articulated car, comprising a plurality of car bodies, a truck for supporting the adjacent end portions of said car bodies, said truck having a pair of bolsters, interengaged body connection castings at the adjacent end portions of the bodies, the castings being respectively engaged with the bolsters for swiveling movement thereon, a transverse truck member between the bolsters, and a member interposed between the castings and straddling the transverse truck member for maintaining the bodies in their proper spaced relation.

7. In an articulated car, comprising a plurality of car bodies, a truck for supporting the adjacent end portions of said bodies, said truck having a pair of bolsters, interengaged body connection castings at the adjacent end portions of the bodies, the castings being respectively engaged with the bolsters for swiveling movement thereon, a transverse truck member between the bolsters, and means straddling the transverse truck member for preventing excessive relative sidewise shifting of the bodies.

8. In an articulated car, comprising a plurality of car bodies, a truck for supporting the adjacent end portions of said car bodies, said truck having a pair of bolsters, interengaged body connection castings at the adjacent end portions of the bodies, the castings being engaged respectively with the bolsters for swiveling movement thereon, a transverse truck member between the bolsters, and a buffing element arranged between and supported by the castings, said element engaging the transverse truck member whereby it is maintained in a substantially fixed position relative to the truck.

9. In an articulated car comprising a plurality of car bodies, a truck for supporting the adjacent end portions of said bodies, said truck having a pair of bolsters on which said end portions are respectively supported, a truck transom intermediate the bolsters, a foot plate bridging the space between the adjacent end portions of the bodies and overlapping the latter, and a member arranged between the said adjacent end portions to which the foot plate is secured, said member straddling the transom whereby to retain the foot plate fixed relative to the truck.

In witness whereof I have hereunto set my hand.

ALLEN W. CLARKE.